US008615591B2

(12) United States Patent
Droms et al.

(10) Patent No.: US 8,615,591 B2
(45) Date of Patent: Dec. 24, 2013

(54) TERMINATION OF A COMMUNICATION SESSION BETWEEN A CLIENT AND A SERVER

(75) Inventors: Ralph E. Droms, Westford, MA (US); Joshua B. Littlefield, Wellesley, MA (US); Brian P. Shorey, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 1677 days.

(21) Appl. No.: 11/331,368

(22) Filed: Jan. 11, 2006

(65) Prior Publication Data

US 2007/0162607 A1 Jul. 12, 2007

(51) Int. Cl.
*G06F 15/16* (2006.01)

(52) U.S. Cl.
USPC .......................................... 709/227; 709/249

(58) Field of Classification Search
USPC ........................................ 709/227, 223, 249
See application file for complete search history.

(56) References Cited

U.S. PATENT DOCUMENTS

| 6,611,868 | B1 * | 8/2003 | Arutyunov | 709/227 |
|---|---|---|---|---|
| 6,718,376 | B1 * | 4/2004 | Chu et al. | 709/223 |
| 6,807,150 | B1 | 10/2004 | McNiff et al. | |
| 6,917,587 | B1 * | 7/2005 | Sarkar et al. | 370/230 |
| 6,917,976 | B1 * | 7/2005 | Slaughter et al. | 709/226 |
| 2001/0007996 | A1 * | 7/2001 | Dulai et al. | 709/225 |
| 2003/0233594 | A1 * | 12/2003 | Earl | 714/4 |
| 2004/0006627 | A1 * | 1/2004 | Sarfaty et al. | 709/228 |
| 2005/0108331 | A1 * | 5/2005 | Osterman | 709/205 |
| 2005/0198190 | A1 * | 9/2005 | Zavalkovsky et al. | 709/217 |
| 2006/0036733 | A1 * | 2/2006 | Fujimoto et al. | 709/225 |

OTHER PUBLICATIONS

"Examining 802.1X and EAP" by Peter J. Welcher pp. 1-7 (Copyright Apr. 6, 2004)http://www.netcraftsmen.net/welcher/papers/dot1x.html.*
"Intel Active Management Technology", Order No. 303749-004US, Intel Corporation, 2005, pp. 1-4.
Fisher, Arthur, A., "Authentication and Authorization: The Big Picture with IEEE 802.1X", SANS Institute, Dec. 21, 2001, pp. 1-11.
Bogowitz, B., et al., "Intel Active Management Technology Reduces IT Costs with Improved PC Manageability", Technology @ Intel Magazine, Intel Corporation, Sep. 2004, pp. 1-7.
Droms, R., "Dynamic Host Configuration Protocol", Request for Comments (RFC) 2131, Internet Engineering Task Force (IETF), Mar. 1997, pp. 1-45.
Metz, C., "OTP Extended Responses", RFC 2243, IETF, Nov. 1997, pp. 1-10.
Alexander, S., et al., "DHCP Options and BOOTP Vendor Extensions", RFC 2132, IETF, Mar. 1997, pp. 1-34.
Blunck, L., et al., "PPP Extensible Authentication Protocol (EAP)", RFC 2284, IETF, Mar. 1998, pp. 1-15.
Haller, N. et al., "A One-Time Password System", RFC 2289, IETF, Feb. 1998, pp. 1-25.
Aboba, B., et al., "Extensible Authentication Protocol (EAP)", RFC 3748, IETF, Jun. 2004, pp. 1-67.

* cited by examiner

*Primary Examiner* — Linglan Edwards
*Assistant Examiner* — Lawrence Cosby

(57) ABSTRACT

A technique for automatically terminating a session between a client and server in a communication network where the client fails to explicitly terminate the session. A client associated with the session is monitored to determine if a condition exists that warrants terminating the session between the client and the server. If a condition exists that warrants terminating the session, a check is performed to determine if the client has notified the server that the session is to be terminated. If not, the server is automatically notified that the session is to be terminated.

14 Claims, 13 Drawing Sheets

500

| OP CODE | HARDWARE TYPE | HARDWARE ADDRESS LENGTH | HOPS |
|---|---|---|---|
| TRANSACTION IDENTIFIER ||||
| SECONDS || FLAGS ||
| CLIENT ADDRESS ||||
| "YOUR" ADDRESS ||||
| SERVER ADDRESS ||||
| GATEWAY ADDRESS ||||
| CLIENT HARDWARE ADDRESS ||||
| SERVER NAME ||||
| BOOT FILENAME ||||
| OPTIONS ||||

FIG. 5

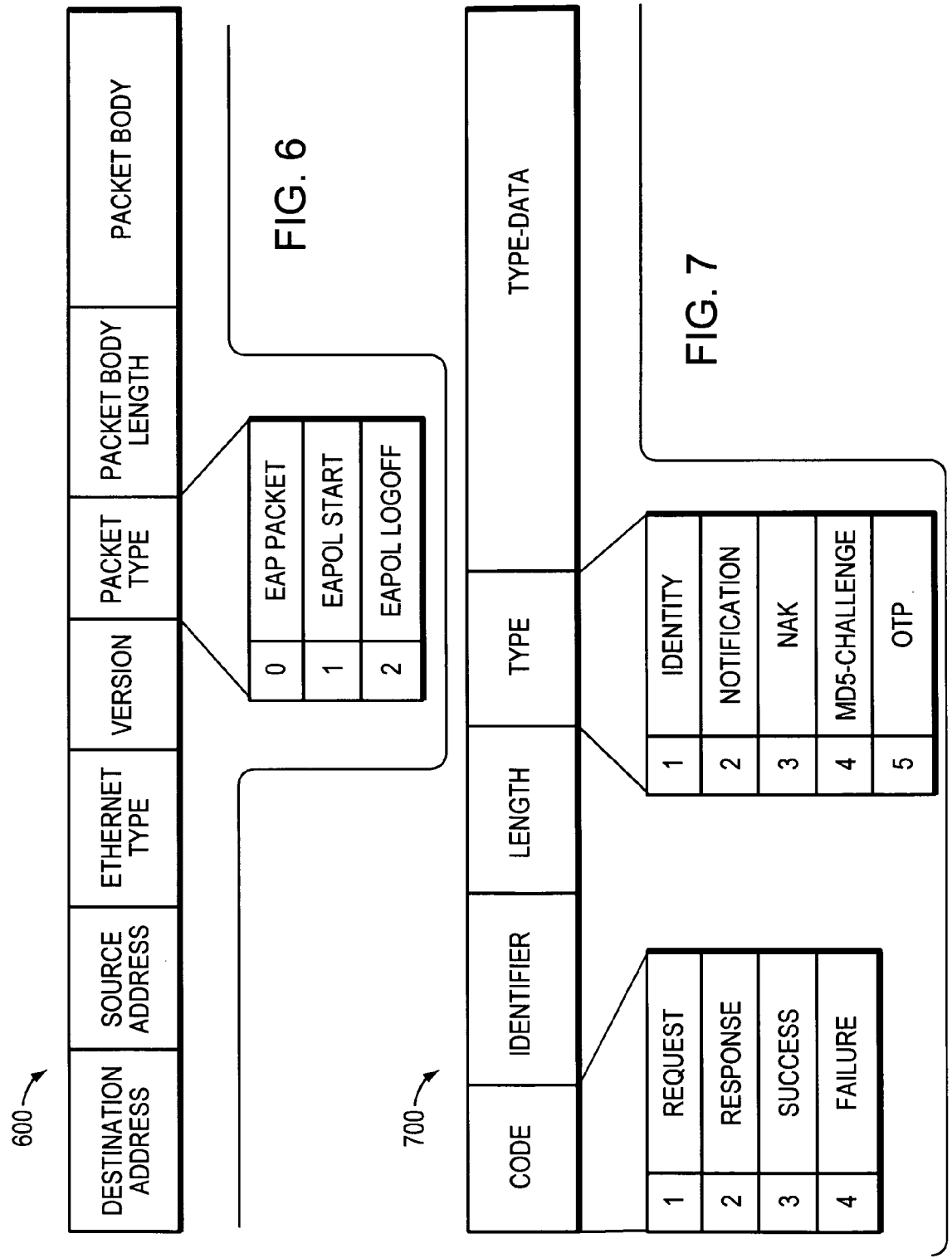

TERMINATION OF A COMMUNICATION SESSION BETWEEN A CLIENT AND A SERVER

FIELD OF THE INVENTION

This invention is related to communication networks and specifically to inserting messages into a communication network.

BACKGROUND OF THE INVENTION

A communication network is a geographically distributed collection of nodes interconnected by communication links and segments for transporting communications (e.g., data, voice, video) between communication units (end nodes), such as personal computers, certain telephones, personal digital assistants (PDAs), video units and the like. Many types of communication networks are available, with the types ranging from local area networks (LANs) to wide area networks (WANs). LANs typically connect nodes over dedicated private communications links located in the same general geographical location, such as a building or campus. WANs, on the other hand, typically connect large numbers of geographically dispersed nodes over long-distance communications links, such as common carrier telephone lines. The Internet is an example of a WAN that connects networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol is a set of rules defining how the nodes interact with each other.

Some network protocols utilize a client/server model that utilizes sessions to communicate information between a client and a server. For example, the Dynamic Host Configuration Protocol (DHCP) utilizes a DHCP session to communicate configuration information between a client and a DHCP server. In accordance with DHCP, the client issues a DHCP-DISCOVER message to request configuration information from the DHCP server. The server receives the DHCPDISCOVER message, generates a DHCPOFFER message containing the configuration information and forwards the DHCPOFFER message to the client. The DHCPOFFER message acts as an "offer" of configuration information to the client which the client may choose to accept or deny.

The client receives the DHCPOFFER message and, if it chooses to accept the offered configuration information, responds to the server with a DHCPREQUEST message. The DHCPREQUEST message indicates to the server that the client has accepted the server's offer. The server receives the DHCPREQUEST message and responds to the client with a DHCPACK message to acknowledge the client's acceptance. The client receives the DHCPACK message. At this point, a DHCP session is established between the client and the server.

The client may later choose to terminate the DHCP session by generating and forwarding a DHCPRELEASE message to the server. The server receives the DHCPRELEASE message and terminates the session.

The configuration information may be provided to the client on a "leased", basis. That is, the server may impose a time limit as to how long the client may use the information. Further, the server may allow the client to keep the information beyond the time limit provided the client "renews" its lease with the server before the time limit expires. If the client fails to renew its lease on time, the configuration information is no longer considered allocated to the client and the client must cease its use.

In some circumstances, the client may no longer need the configuration information prior to the expiration of the time limit. Here, the client may "release" the information for use by other clients in the system by notifying the server that it no longer needs the configuration information. In DHCP, for example, if a client no longer needs configuration information supplied to the client by a DHCP server, the client may "release" the configuration information by generating a DHCPRELEASE message and forwarding the DHCPRELEASE message to the DHCP server. On receiving the DHCPRELEASE message, the DHCP server knows that the client no longer wishes to use the configuration information and can safely-allocate the configuration information to a different client.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is a block diagram of a Dynamic Host Configuration Protocol (DHCP) message that may be used with the present invention.

FIG. 6 is a block diagram of an Institute of Electrical and Electronic Engineers (IEEE) 802.1x packet that may be used with the present invention.

FIG. 7 is a block diagram of an Extensible Authentication Protocol (EAP) message that may be used with the present invention.

DETAILED DESCRIPTION OF THE INVENTION

A description of preferred embodiments of the invention follows.

It should be noted that illustrated embodiments of the invention, as described herein, are described as using the Dynamic Host Control Protocol (DHCP), the Institute of Electrical and Electronics Engineers (IEEE) 802.1x protocol and the Extensible Authentication Protocol (EAP). It should be noted that other protocols that involve client-server sessions may be adapted to take advantage of the present invention.

One problem with the above-described client-server arrangements is that if a client no longer needs leased resources provided by a server and fails to voluntarily notify the server that it no longer needs the leased resources, the leased resources may remain unavailable for use by other clients until the lease expires. This may pose a significant problem especially if the resources allocated to the client are scarce.

The present invention overcomes shortcomings associated with the prior art by providing a technique for automatically terminating a session between a client and server in a communication network. According to an aspect of the present invention, a client associated with a session between the client and a server is monitored to determine if a condition exists that warrants terminating the session between the client and the server. If a condition exists that warrants terminating the session, a check is performed to determine if the client has notified the server that the session is to be terminated. If not, the server is automatically notified that the session is to be terminated.

Advantageously, the present invention is an improvement over the prior art in that it enables client-server sessions to be terminated if a client is unable or fails to explicitly do so. This enables resources allocated to the client to be made readily available for allocation to other clients.

Figure 1:
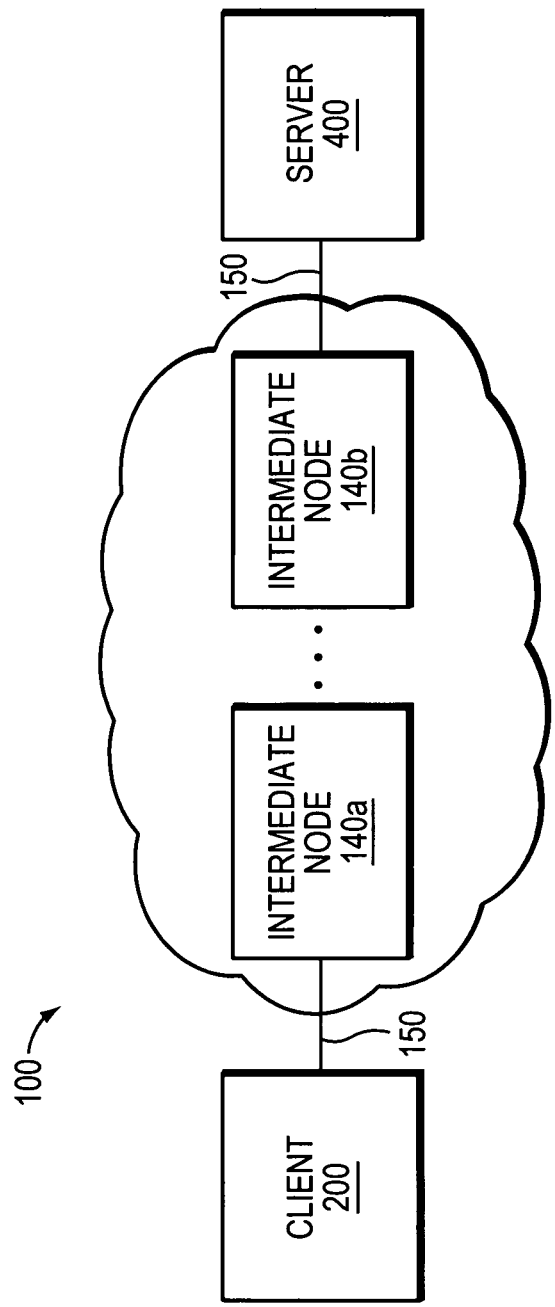
FIG. 1 is a block diagram of an exemplary client-server network that may be used with the present invention.

FIG. 1 is a high-level block diagram of an exemplary communication network that may implement the present invention. Communication network 100 comprises a collection of communication links 150 interconnecting a plurality of nodes, such as client node 200, intermediate nodes 140 and server node 400. These internetworked nodes communicate by exchanging data packets according to a pre-defined set of network protocols, such as the Transmission Control Protocol/Internet Protocol (TCP/IP), the IEEE 802.1x protocol, DHCP and EAP. A network protocol as used herein is a formal set of rules that define how data is exchanged between nodes on a communication network.

Intermediate nodes 140 are illustratively routers configured to perform various conventional layer-2 (L2) and layer-3 (L3) switching and routing functions including forwarding and processing data packets in accordance with an aspect of the present invention. As used herein, L2 and L3 refer to the data-link layer and the network layer, respectively, of the Open Systems Interconnection Reference Model (OSI-RM). The intermediate nodes 140 may be configured to support various combinations of protocols including, e.g., the Open Shortest Path First (OSPF) protocol, the Intermediate-System-Intermediate-System (IS-IS) protocol, TCP/IP, Ethernet, Asynchronous Transfer Mode (ATM), and Frame Relay (FR). Suitable routers that may be used with the present invention include the Cisco 7200 and 7600 series routers available from Cisco Systems Incorporated, San Jose, Calif.

Figure 2:
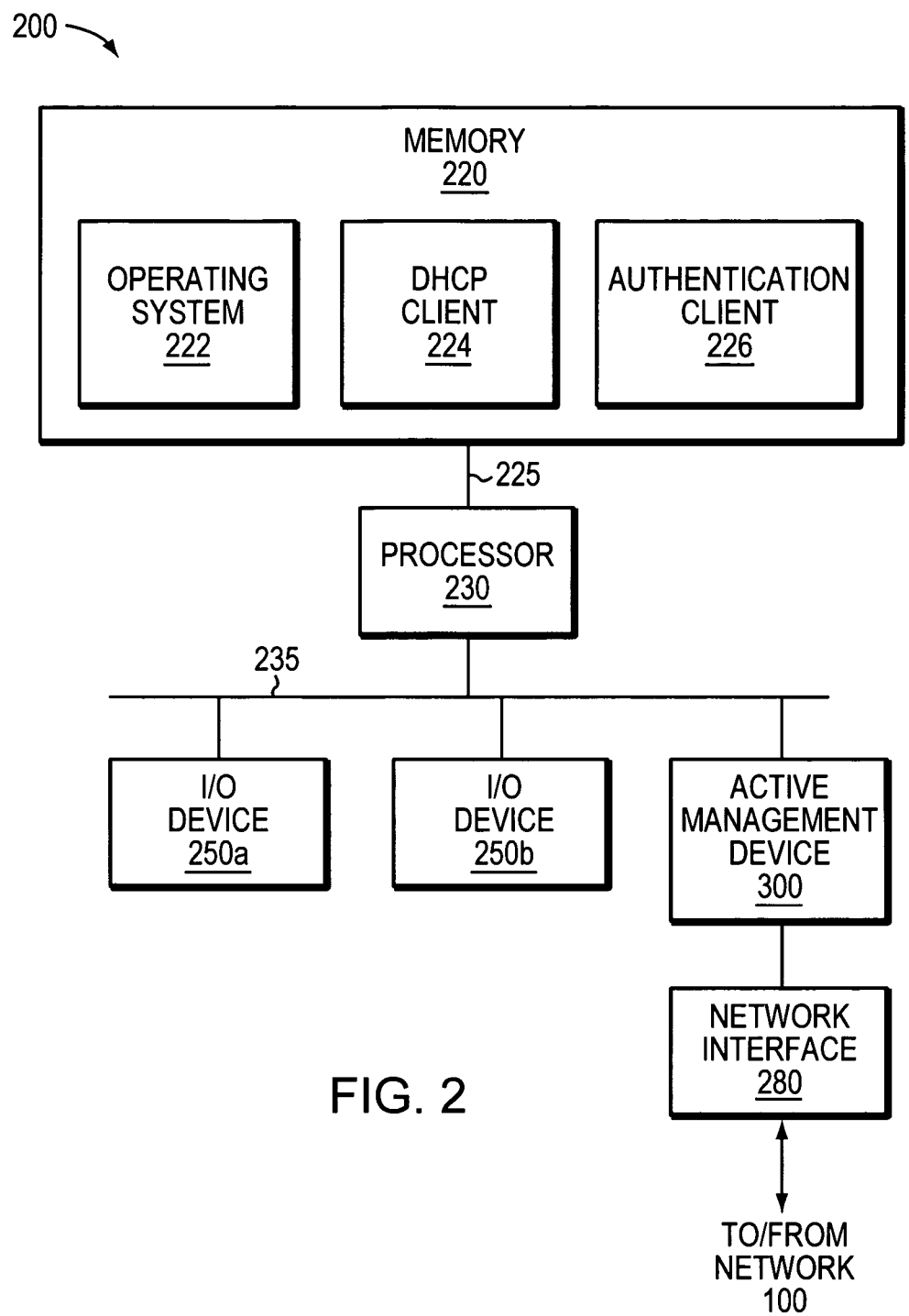
FIG. 2 is a block diagram of a client node that may be used with the present invention.

Client node 200 is a conventional end node, such as a work station or personal computer (PC), which is capable of establishing and terminating a client-server session with other nodes in the network. FIG. 2 is a schematic block diagram of client node 200. Node 200 comprises a memory 220, a processor 230, one or more input/output (I/O) devices 250, an active management device 300 and a network interface 280.

The processor 230 is a conventional central processing unit (CPU) configured to execute computer-executable instructions and manipulate data structures contained in memory 220. The I/O devices 250 are conventional I/O devices that enable information to be input and output to and from the client node 200, respectively. These devices may include keyboards, pointing devices (computer mice), disk units, display devices and the like. The network interface 280 is a conventional network interface that interfaces the client node 200 with the network 100 and enables data to be transferred between the client node 200 and the network 100.

The memory 220 is a computer-readable medium comprising random-access memory (RAM) devices, such as dynamic RAM (DRAM) devices. Memory 220 contains various software and data structures used by the processor 230 for performing various functions on client node 200. These software and data structures include operating system 222, DHCP client 224 and authentication client 226.

The operating system 222 comprises software functions that enable processes, such as DHCP client 224 and authentication client 226, to execute on node 200. These functions include conventional operating system functions that schedule the processes for execution on the processor 230 as well as manage various system resources, such as memory that is allocated to the processes.

The DHCP client 224 comprises software functions that are configured to implement a conventional DHCP client that operates in accordance with the DHCP protocol. A version of the DHCP protocol that may be used with the present invention is described in R. Droms, "Dynamic Host Configuration Protocol" Request For Comments (RFC) 2131 which is available from the Internet Engineering Task Force (IETF) and which is hereby incorporated by reference in its entirety as though fully set forth herein.

Functions performed by the DHCP client 224 include establishing and maintaining DHCP sessions between the client node 200 and one or more DHCP servers as well as maintaining configuration information acquired via the DHCP sessions including, e.g., one or more IP addresses that may be used by client node 200 to communicate with other nodes in the network 100 using the IP protocol.

The authentication client 226 comprises software functions configured to implement an EAP client that operates in accordance with the EAP protocol. A version of the EAP protocol that may be used with the present invention is described in B. Aboda, et al., "Extensible Authentication Protocol (EAP)," RFC 3748, which is available from the IETF and which is incorporated by reference in its entirety as though fully set forth herein. Functions performed by the authentication client 226 illustratively include establishing and maintaining EAP authentication sessions between the client node 200 and EAP authenticators (e.g., intermediate nodes 140) in the network 100.

Figure 3:
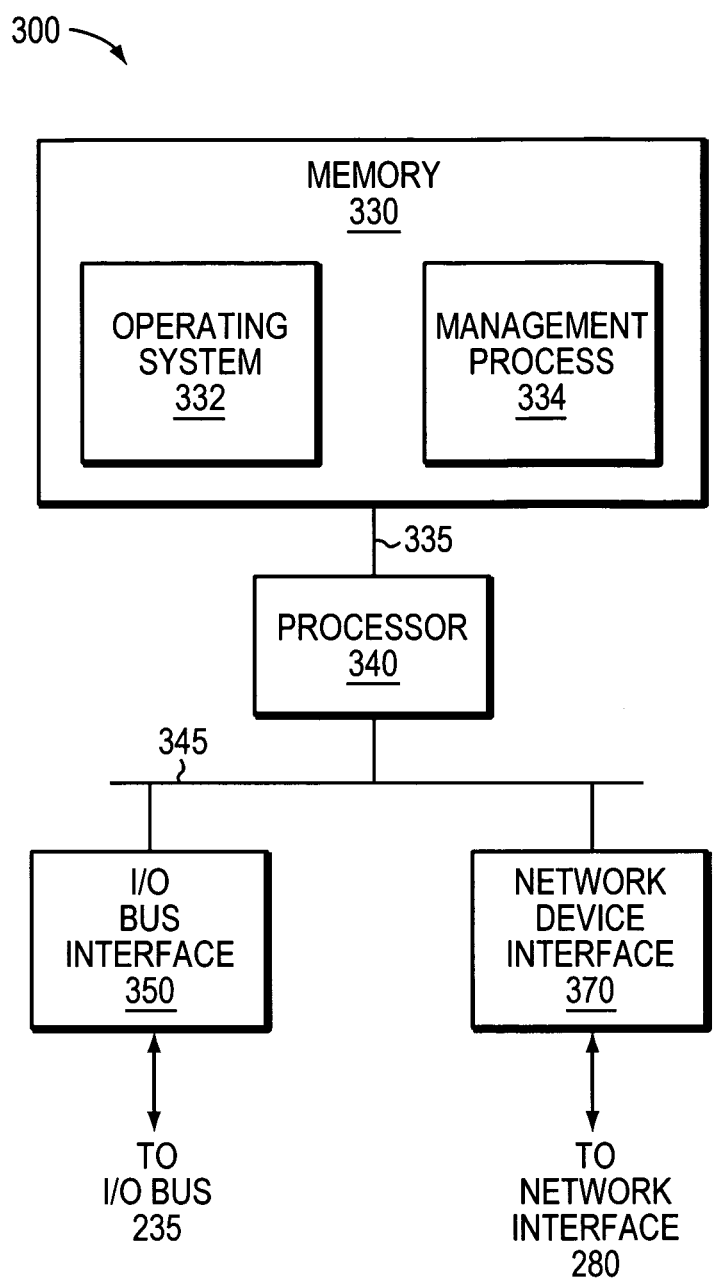
FIG. 3 is a block diagram of an active management device that may be used with the present invention.

The active management device 300 is configured to terminate client-server sessions associated with client node 200 in accordance with an aspect of the present invention. FIG. 3 is a block diagram of an active management device 300 that may be used with the present invention. Active management device 300 comprises a memory 330, a processor 340, an I/O bus interface 350 and a network device interface 370. The memory 330 is coupled to the processor 340 via a memory bus 335 which enables data to be transferred between the processor 340 and memory 330. The processor 340 is coupled to the I/O bus interface 350 and the network device interface 370 via an I/O bus 345 which enables data to be transferred between the processor 340 and these interfaces 350, 370.

The processor 340 is a conventional CPU that is configured to execute instructions and manipulate data structures contained in memory 330. The network device interface 370 comprises logic that interfaces the active management device 300 with the client node's network interface circuitry 280 and enables data to be transferred between the active management device 300 and the network interface 280.

The I/O bus interface 350 comprises logic that interfaces the active management device 300 with the I/O bus 235 of the client node 200 and enables data to be transferred between the active management device 300 and the client node's processor 230. This data illustratively includes messages transferred from the client node 200 to the server 400 that are related to a session between the client node 200 and the server 400 as well as information associated with various states of the client node 200 (e.g., the client node is active, the client node is being powered down, etc.). This data may be used by the processor 340 to, as will be described further below, determine if messages have been sent by the client node 200 to terminate sessions between the client node 200 and the server 400 as well as determine if conditions exist with the client node 200 that warrant terminating sessions between the client node 200 and the server node 400.

The memory 330 is a computer-readable medium comprising RAM devices, such as DRAM devices. Memory 330 contains various software and data structures including operating system 332 and management process 334. The operating system 332 is a conventional operating system configured to perform conventional operating system functions including scheduling processes, such as management process 334, for execution on the processor 340. Management process 334 comprises computer-executable instructions and data structures configured to, inter alia, terminate client-server sessions between the client node 200 and the other nodes in the network 100 in accordance with an aspect of the present invention.

Figure 4:
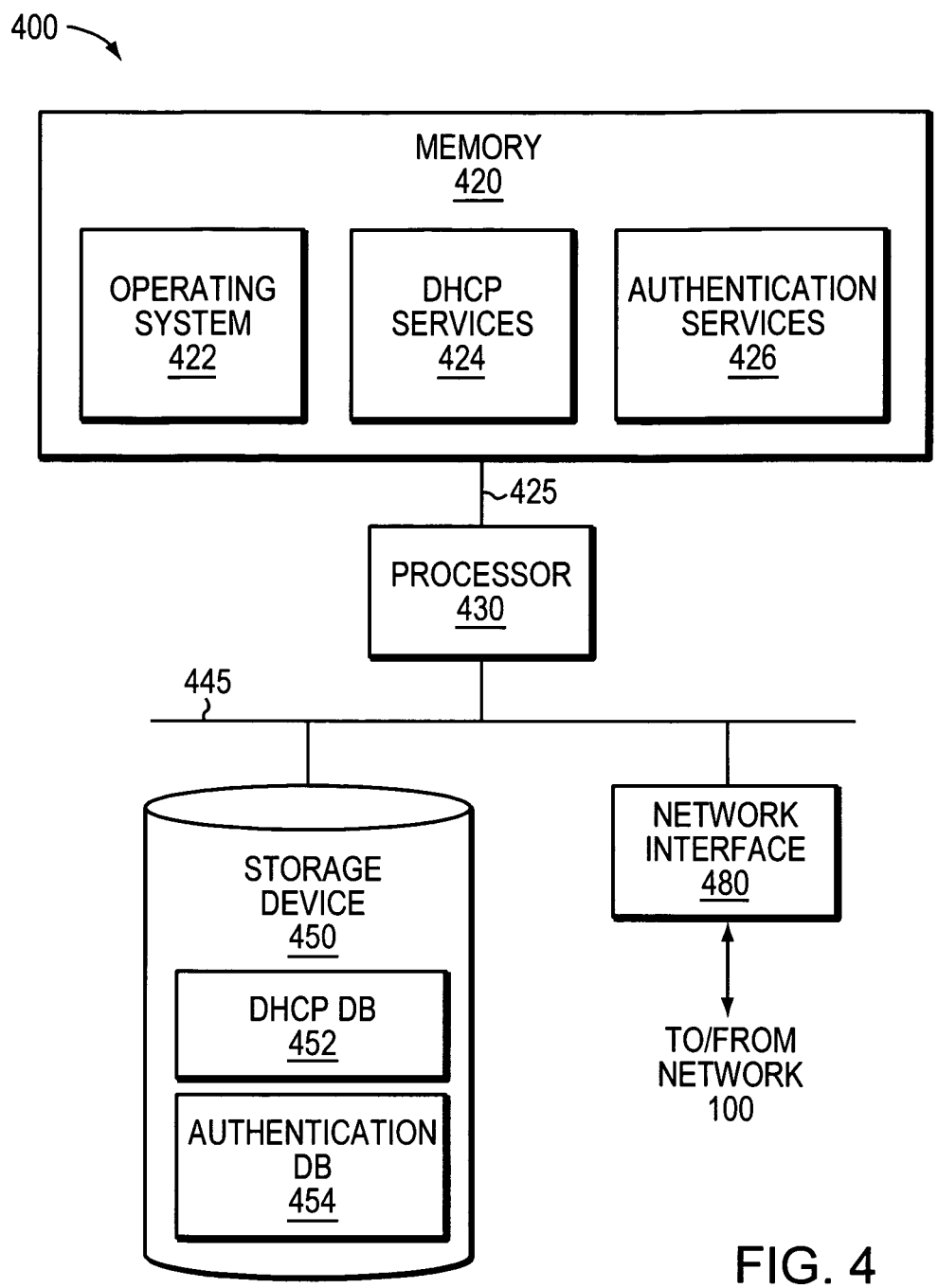
FIG. 4 is a partial block diagram of a server node that may be used with the present invention.

FIG. 4 is a partial block diagram of a server node 400 that may be used with the present invention. Server node 400 comprises a memory 420, a processor 430, a storage device 450 and a network interface 480. It should be noted that server node 400 may contain other devices, such as keyboards, display units and the like, found on conventional servers.

The memory 420 is coupled to the processor via a memory bus 425 which enables data to be transferred between the processor and memory 420. The storage device 450 and network interface 480 are coupled to the processor 430 via an I/O bus 445 which enables data to be transferred between the processor 430 and the storage device 450 and network interface 480.

The processor 430 is a conventional CPU configured to execute instructions and manipulate data structures contained in the memory 420. Memory 420 is a RAM comprising RAM devices, such as DRAM devices. Memory 420 includes an operating system 422, DHCP services 424 and authentication services 426. The operating system 422 is a conventional operating system that comprises software functions that enable processes, such as DHCP services 424 and authentication services 426, to execute on processor 430.

DHCP services 424 is a software process that comprises software configured to implement various conventional DHCP server functions, such as establishing and maintaining DHCP sessions with client nodes. Authentication services 426 is a software process that is configured to implement a conventional server for authenticating clients in network 100 in accordance with, e.g., the RADIUS protocol. A version of the RADIUS protocol that may be used with the present invention is described in C. Rigney et al., "Remote Authentication Dial In User Service (RADIUS)," RFC 2865 which is available from the IETF and which is hereby incorporated by reference as though fully set forth herein.

The network interface 480 is a conventional network interface that enables data (packets) to be transferred between the server node 400 and the network 100. This data may comprise DHCP messages that are used to establish and maintain DHCP sessions between the server 400 and clients nodes (e.g., node 200) in the network 100 as well as RADIUS messages that may be used to authenticate, e.g., users at client node 200.

The storage device 450 is a conventional storage device that is configured to hold data used by the server 400. Illustratively, storage device 450 is a hard disk device, however, it should be noted that other types of storage devices may be used to implement storage device 450, such as flash memory devices, DRAM devices, floppy disks and the like. Storage device 450 comprises a DHCP database (DB) 452 and an authentication DB 454.

The DHCP DB 452 is configured to hold configuration information that is provided to DHCP clients in network 100. This configuration information may include addresses (e.g., IP addresses) that are used by the clients to communicate with nodes in the network 100. The authentication database DB 454 is configured to hold information that is used to authenticate clients in the network 100. This information may include conventional authentication information that is typically maintained by RADIUS servers, such as user name and password information associated with clients that access network 100.

As noted above, the present invention may be used to terminate sessions established using the DHCP protocol. In accordance with DHCP, sessions are established and terminated using DHCP messages. FIG. 5 is a block diagram of a DHCP message 500 that may be used with the present invention.

Message 500 comprises various fields including op code, hardware type, hardware address length, hops, transaction identifier, seconds, flags, client address, "your" address, server address, gateway address, client hardware address, server name, boot file name information and options fields. The op code field holds a value that indicates whether the message is a DHCP request message or a DHCP response message. The hardware type field holds a value that specifies a type of hardware (e.g., Ethernet) that is used by the entity issuing the message 500 to access the network. The hardware address length field holds a value that indicates a length of a hardware address in the hardware message field of the message 500. The hops field holds a value that specifies hop information that may be used by various nodes to control the forwarding of the message 500 in the network.

The transaction identifier field holds a value that represents an identifier that may be used to match a DHCP request message with a corresponding DHCP response message. For messages 500 related to acquiring configuration information (e.g., an IP address), the seconds field holds a value that indicates a number of seconds that has elapsed since the client began attempting to acquire the configuration information. For messages 500 related to renewing a lease of configuration information, the seconds field holds an elapsed time associated with renewing the lease. The flags field holds a value that indicates various flags associated with the message 500.

The client address field holds a value that represents an address associated with the client (e.g., an IP address). The "your" address holds a value that represents an address assigned to the client by the DHCP server. The server address field holds a value that represents an address (e.g., an IP address) associated a next server a client should use when performing a bootstrap operation using, e.g., the Trivial File Transfer Protocol (TFTP). The gateway address field holds a value that represents an address associated with a gateway device used as a relay agent. The client hardware address field holds a value that represents a hardware address associated with the client. The server name field holds a value that represents a name associated with the server whose address is in the server address field. The boot file name field holds a value that represents a specific boot file requested by a client.

The options field holds one or more options associated with the message 500. These options may include an option that indicates a type of the DHCP message 500. Types of DHCP messages 500 that may be encoded in the options field include DHCPDISCOVER, DHCPOFFER, DHCPREQUEST, DHCPDECLINE, DHCPACK, DHCPNAK, DHCPRELEASE and DHCPINFORM type messages. These DHCP message types are described in S. Alexander et al., "DHCP Options and BOOTP Vendor Extensions," RFC 2132 which is available from the IETF and which is incorporated herein by reference in its entirety as though fully set forth herein.

In addition to DHCP, the present invention may be used to terminate authentication sessions established between a client node and an authenticator node using the EAP and IEEE 802.1x protocols. These authentication sessions are established and terminated using a combination of 802.1x packets and EAP.

FIG. 6 illustrates an IEEE 802.1x packet 600 that may be used with the present invention. Packet 600 comprises a destination address field, a source address field, an Ethernet type field, a version field, a packet type field, a packet body length field and a packet body field. The destination address field holds a value that represents a media access control (MAC) address associated with the node that is to the receive the packet 600. The source address field holds a value that represents a MAC address of a node that originated (sourced) the packet 600. The Ethernet type field holds a value that indicates that the packet is an IEEE 802.1x type packet. Illustratively, this value is set to a hexadecimal value of 0x888e. The version field holds a value that indicates a version of the 802.1x protocol that is supported by the packet 600. The packet type field holds a value that indicates a type of 802.1x packet. This type illustratively indicates the packet is either an EAP type packet (i.e., contains an EAP message in the packet body field), EAPOL-START packet or EAPOL-LOGOFF packet. The body length field is configured to hold a value that represents a length of the packet body field, illustratively in bytes. The packet body field holds the packet's payload data.

As noted above, a packet 600 whose packet type field indicates the packet 600 is an EAP type packet contains an EAP message in its packet body field. FIG. 7 is a block diagram of an EAP message 700 that may be used with the present invention. Message 700 comprises a code field, an identifier field, a length field, a type field and a type-data field. The code field holds a value that represents an EAP message type. EAP message types include an EAP request message and an EAP response message. The identifier field holds a value that enables EAP request messages to be matched with EAP response messages. The length field holds a value that represents a length of the message 700, illustratively in bytes. The type field holds a value that indicates a type of request for EAP request messages. Illustratively, EAP request message types include an identity request, notification request, MD5-challenge request and one-time password (OTP) type request. The type-data field holds a value that represents payload data associated with the message 700.

Figure 8:
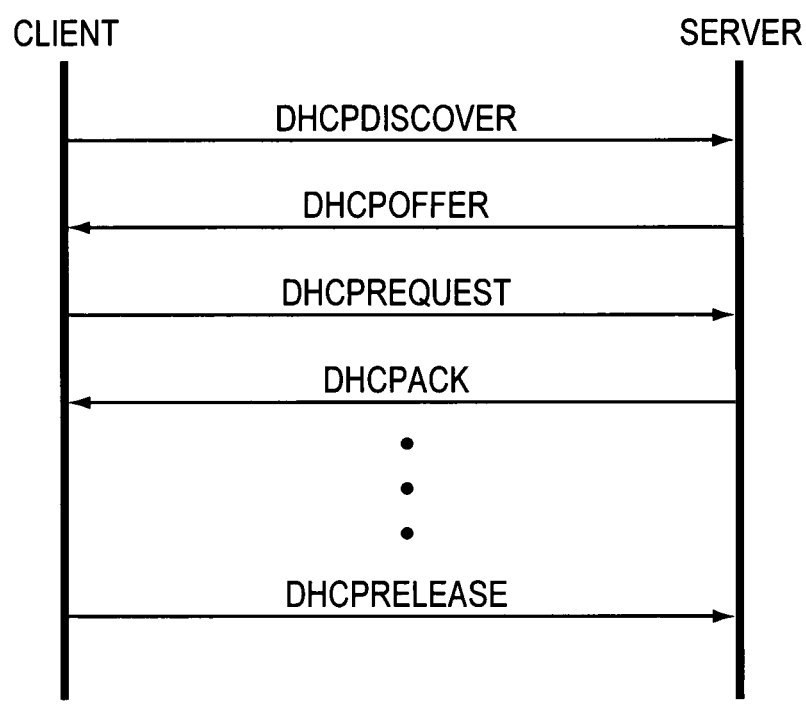
FIG. 8 illustrates a dialogue between a DHCP client and a DHCP server that involves establishing and terminating a DHCP session.
Figure 9:
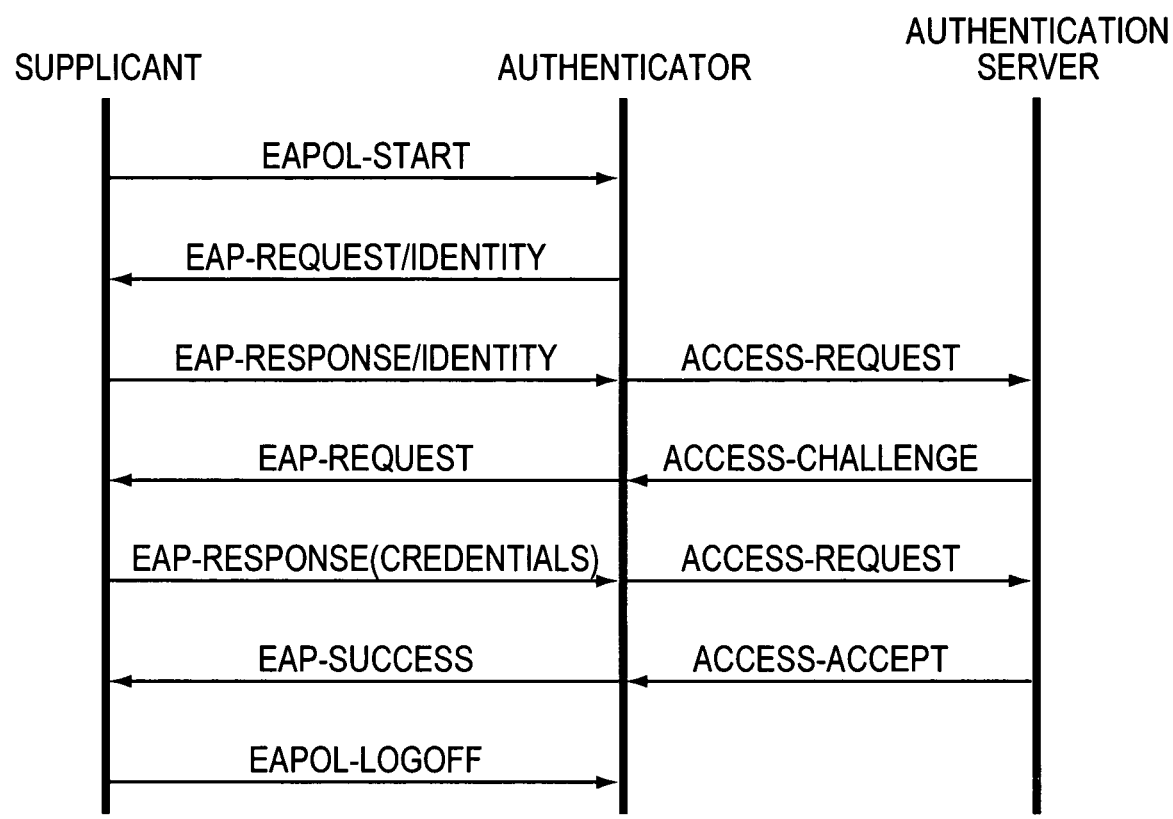
FIG. 9 illustrates a dialogue between a supplicant, an authenticator and an authentication server that involves establishing and terminating an EAP authentication session.

DHCP and authentication sessions are typically established and terminated using a pre-defined sequence of message exchanges. FIGS. 8 and 9 illustrate exemplary message exchanges for a DHCP session and an EAP authentication session, respectively.

Referring to FIG. 8, a DHCP client begins a DHCP session by broadcasting a DHCPDISCOVER message. As used herein, DHCPDISCOVER, DHCPOFFER, DHCPREQUEST and DHCPACK messages are DHCP messages 500 that indicate DHCPDISCOVER, DHCPOFFER, DHCPREQUEST and DHCPACK, respectively, in their options field. The DHCPDISCOVER message is received by a DHCP server which responds to the DHCPDISCOVER message with a DHCPOFFER message. The DHCPOFFER message includes configuration information (e.g., an IP address) which is offered by the server for use by the client. If the client accepts the server's offer, it broadcasts a DHCPREQUEST message to the server wherein the DHCPREQUEST message contains the address of the server. The server responds to the DHCPREQUEST message with an acknowledgment message (DHCPACK). At this point, a DHCP session has been established between the client and the server. At some later time, the client may choose to end the DHCP session and hence relinquish its control of the configuration information by sending a DHCPRELEASE message to the server. The server receives the DHCPRELEASE message, concludes that the session has terminated and releases the configuration information for reallocation to other clients.

Note that more than one DHCP server may receive the DHCPDISCOVER message and each recipient may, in turn, respond with a DHCPOFFER message. In this case, the client receives the DHCPOFFER messages and selects the configuration information from one of the messages. The client then places the address of the server associated with the selected configuration information in the DHCPREQUEST message which is then broadcast to the DHCP servers. The DHCP servers receive the DHCPREQUEST message, examine the address of the server contained therein to determine if they were selected by the client. Servers that are not selected treat the DHCPREQUEST message as a rejection and a failed attempt to establish a session. The server that is selected treats the DHCPREQUEST message as an indication (1) that the client has accepted the server's offer of configuration information and (2) that the client wishes to establish a DHCP session with that server.

With regards to EAP authentication sessions, FIG. 9 illustrates an EAP authentication session between a supplicant (client) and an authenticator (server). The session further involves an authentication server which is illustratively a RADIUS server that is used by the authenticator to authenticate the supplicant.

The authentication session begins with the supplicant issuing an IEEE 802.1x packet 600 wherein the packet type field indicates the packet 600 is an EAPOL-START packet. The authenticator receives the EAPOL-START packet, generates an EAP message 700 wherein the code and type fields indicate that the message is a request for the supplicant's identity (EAP-REQUEST/IDENTITY message) and forwards the EAP-REQUEST/IDENTITY message to the supplicant. The supplicant receives the EAP-REQUEST/IDENTIFY message, generates an EAP message 700 containing its identity and forwards it to the authenticator.

The authenticator receives the EAP-RESPONSE/IDENTITY message with the supplicant's identity, generates an ACCESS-REQUEST message containing the identity information and forwards the ACCESS-REQUEST message to the authentication server. The authentication server receives the ACCESS-REQUEST message, uses the supplicant's identity information to locate a "challenge" that is illustratively used to challenge the supplicant's identity, generates an ACCESS-CHALLENGE message containing the challenge and forwards the ACCESS-CHALLENGE message to the authenticator. The authenticator receives the ACCESS-CHALLENGE message, generates an EAP message 700 wherein the type field indicates the message 700 is a request (EAP-REQUEST message), places the challenge in the EAP-REQUEST message and forwards the message to the supplicant.

The supplicant receives the EAP-REQUEST message with the challenge information and processes it including, e.g., locating credentials that satisfy the challenge. The supplicant then generates an EAP-RESPONSE message 700 containing the credentials and forwards the message 700 to the authenticator. The authenticator receives the EAP-RESPONSE message 700, generates an ACCESS-REQUEST message containing the supplicant's credentials and forwards the ACCESS-REQUEST message to the authentication server.

The authenticator server receives the ACCESS-REQUEST message and processes it including determining if the credentials provided by the supplicant are valid. If so, the authentication server generates an ACCESS-ACCEPT message and forwards it to the authenticator. The authenticator receives the ACCESS-ACCEPT message, generates an EAP message 700 wherein the code field indicates success (EAP-SUCCESS message), and forwards the message to the supplicant. The supplicant receives the EAP-SUCCESS message and concludes that it may access the network. At this point, an authentication session has been established between the supplicant and the authenticator and the supplicant may now access the network.

In accordance with EAP, the supplicant may choose to voluntarily terminate the established session by (1) generating a packet 600 wherein the packet type field indicates EAPOL-LOGOFF and (2) forwarding the packet 600 to the authenticator. The authenticator receives the packet 600 and processes it including terminating the authentication session.

Figure 10:
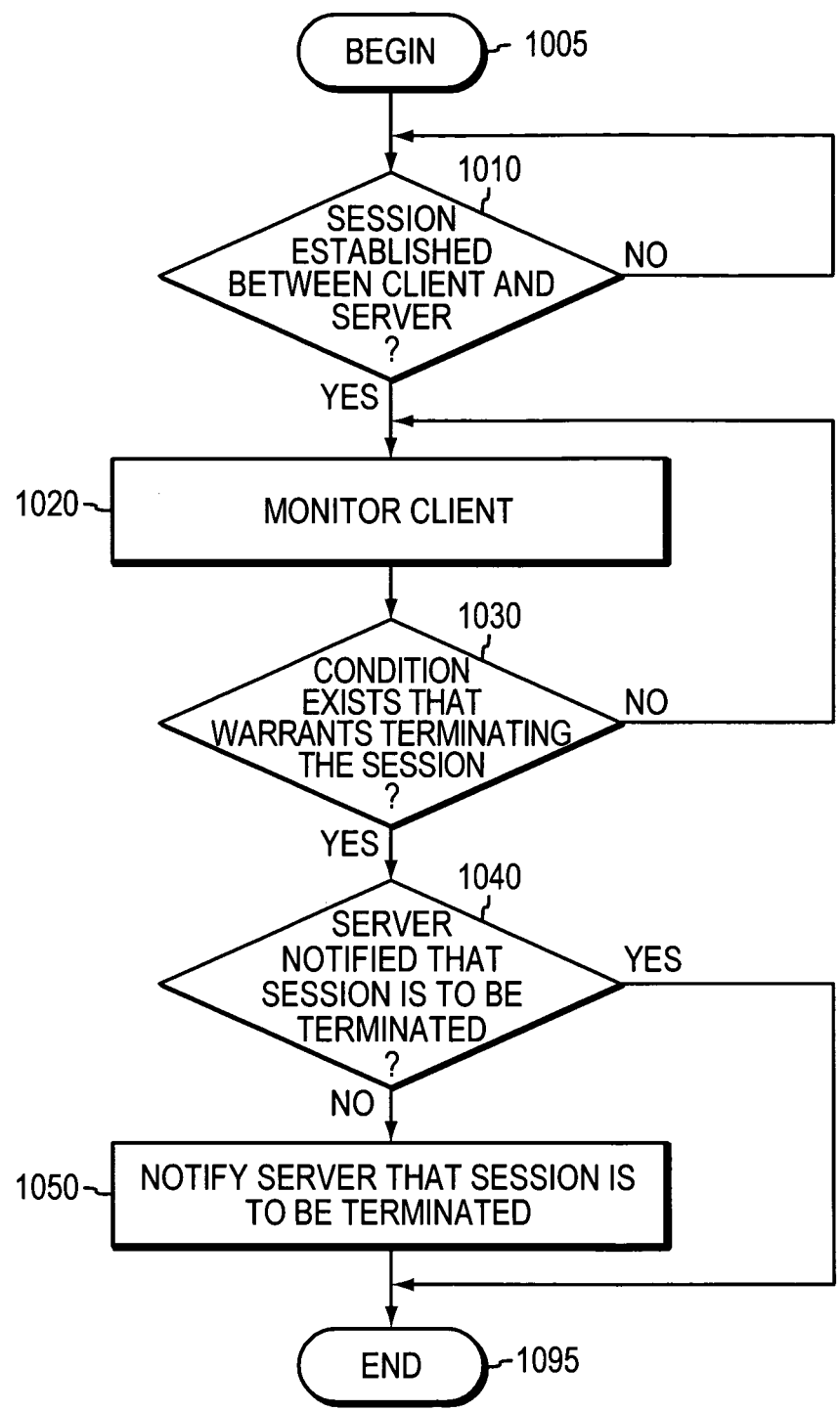
FIG. 10 is a flow chart of a sequence of steps that may be used to terminate a session between a client and a server in accordance with an aspect of the present invention.

Illustratively, active management device 300 is configured to automatically terminate client-server sessions between client node 200 and other nodes in the network 100. FIG. 10 is a flow chart of a sequence of steps that may be used to configure active management device 300 to terminate a session between a client node 200 (client) and another node in the network 100 (server) in accordance with an aspect of the present invention. The sequence begins at step 1005 and proceeds to step 1010 where a check is performed to determine if a session has been established between the client and the server. Illustratively, this check is performed by monitoring messages associated with establishing a session between the client and the server to determine if the requisite exchange of messages has occurred such that a session has been established between the client and the server.

After a session has been established, the sequence proceeds to the step 1020 where the client is monitored. This monitoring may include checking messages that are transferred between the client and server as well as checking the operational status of the client. At step 1030 a check is performed to determine if a condition exists with client that warrants terminating the session between the client and the server. Conditions that warrant terminating the session may include the client issuing a message that indicates it is terminating the session (e.g., DHCPRELEASE message, EAPOL-LOGOFF message) or the client is generally unable to continue the session. Examples where the client may be unable to continue the session include the client software has run to completion or the client process has been otherwise terminated.

If conditions do not exist that warrant terminating the session, the sequence returns to step 1020. Otherwise, the sequence proceeds to step 1040 where a check is performed to determine if the client has notified the server that the session is to be terminated. Illustratively, the client notifies the server that the session is to be terminated by issuing a message to the server wherein the message indicates the session is to be terminated. If the client has notified the server that the session is to be terminated, the sequence proceeds to step 1095. Otherwise, the sequence proceeds to step 1050 where the server is automatically notified that the session is to be terminated. Illustratively, the client notifies the server that the session is to be terminated by generating a message (e.g., DHCPRELEASE message, EAPOL-LOGOFF message) that indicates the session is to be terminated and forwarding the message to the server. The sequence ends at step 1095.

Figure 11A:
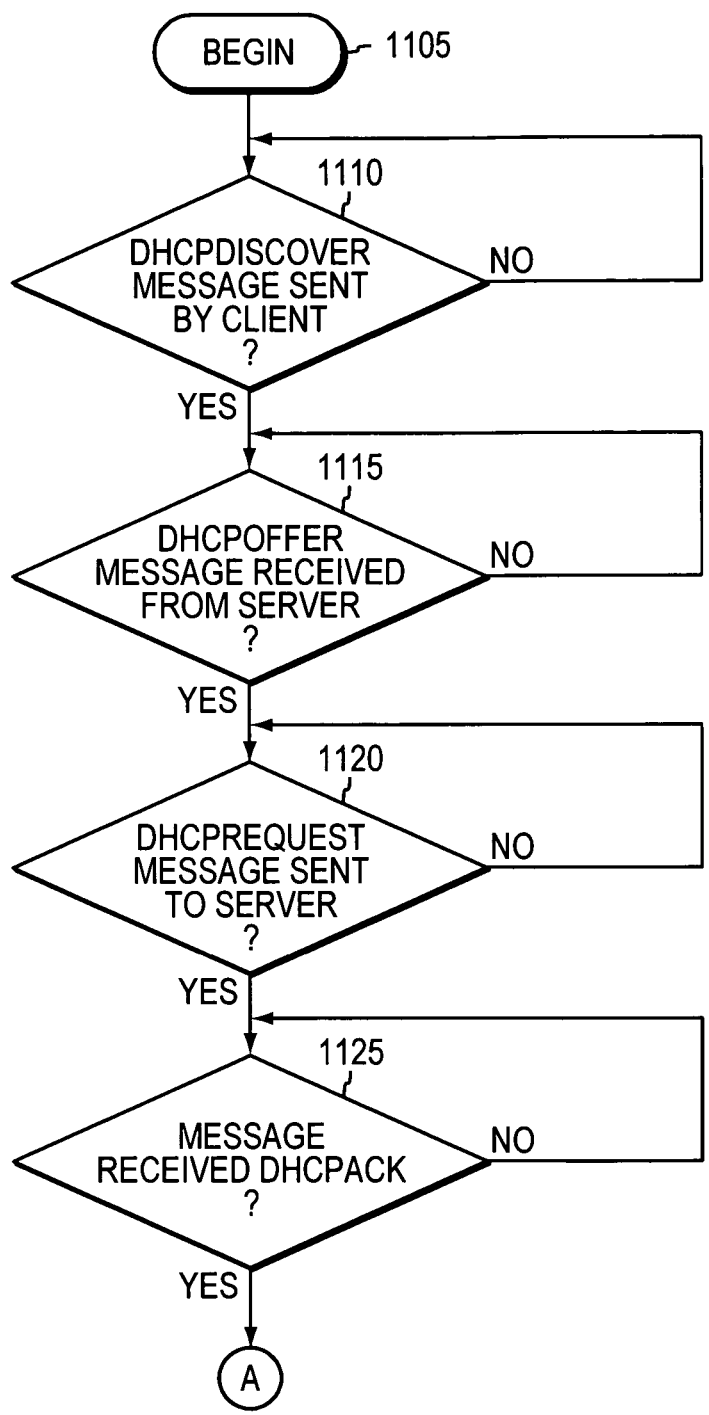
FIGS. 11A-B are a flowchart of a sequence of steps that may be used to configure a client to terminate a DHCP session between the client and a server in accordance with an aspect of the present invention.
Figure 11B:
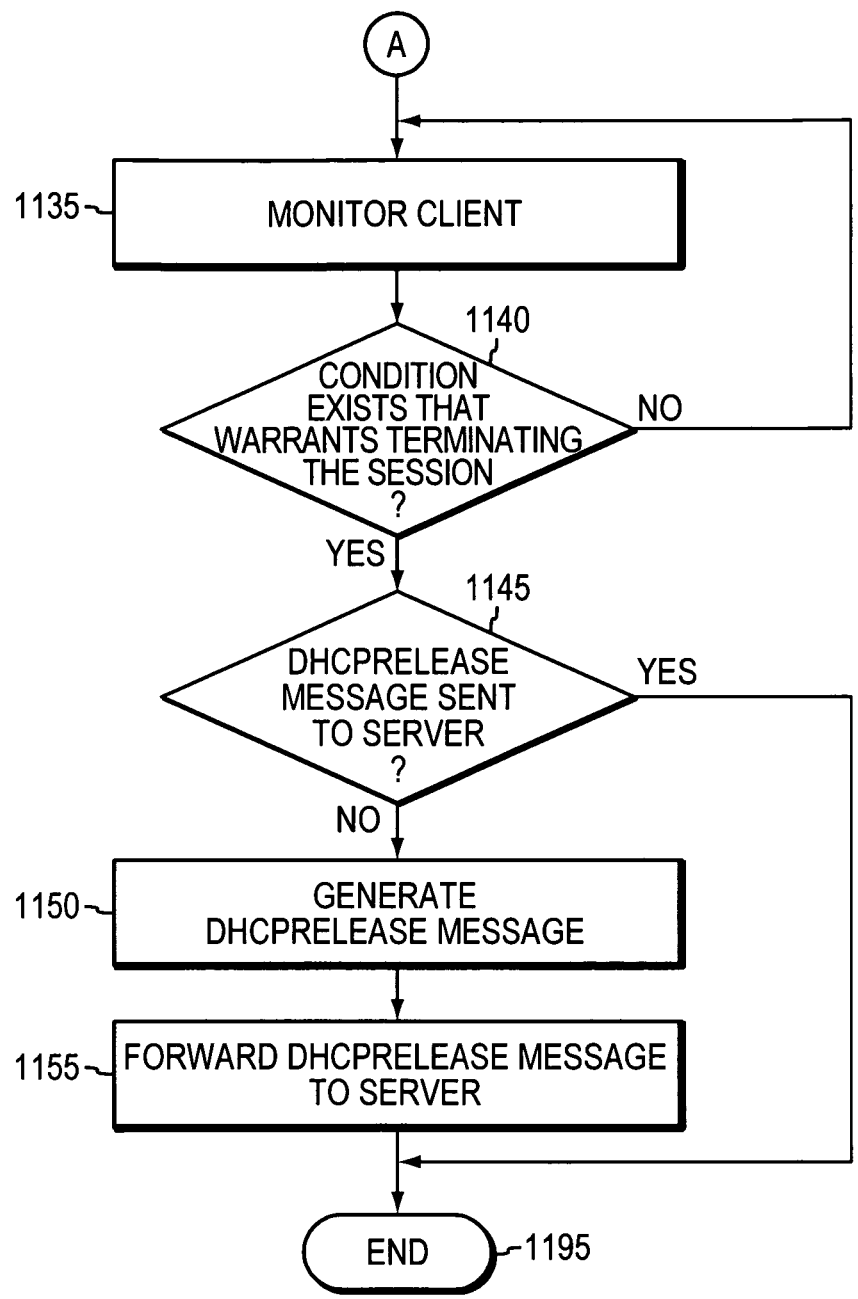

As noted above, the present invention may be used by a client to automatically terminate a DHCP session between the client and a DHCP server. FIGS. 11A-B are a flowchart of a sequence of steps that may be used to configure a client (e.g., client node 200) to terminate a DHCP session between the client and a server in accordance with an aspect of the present invention. The sequence begins at step 1105 and proceeds to step 1110 where a check is performed to determine if the client has sent a DHCPDISCOVER message. If not, the sequence returns to step 1110. Otherwise, the sequence proceeds to step 1115 where a check is performed to determine if a DHCPOFFER message has been received from the server. If not, the sequence returns to step 1115. Otherwise, the sequence proceeds to step 1120 where a check is performed to determine if a DHCPREQUEST message has been sent by the client. If not, the sequence returns to step 1120. Otherwise, the sequence proceeds to step 1125, where a check is performed to determine if a DHCPACK message has been received from the server. If not, the sequence returns to step 1125.

At step 1135 (FIG. 11B), the client is monitored and, at step 1140, a check is performed to determine if a condition exists with the client that warrants terminating the DHCP session between the client and the server, as described above. If a condition that warrants terminating the session does not exist, the sequence returns to step 1135. Otherwise, the sequence proceeds to step 1145 where a check is performed to determine if the client has already issued a DHCPRELEASE message. If so, the sequence proceeds to step 1195. Otherwise, the sequence proceeds to step 1150 where a DHCPRELEASE message is generated and step 1155 where the generated DHCPRELEASE message is forwarded to the DHCP server. The sequence ends at step 1195.

For example, referring to FIGS. 1, 10 and 11A-B, assume that client node 200 is configured to terminate DHCP sessions with servers as described above. Further assume that client 200 is to establish a DHCP session with server 400 and some time after the session is established the session is to be terminated.

Client 200 initiates establishing the DHCP session by generating a DHCPDISCOVER message and forwarding the message to server 400. Specifically, processor 230 (FIG. 2) executing the DHCP client 224 generates the DHCPDISCOVER message 500 and forwards the message via I/O bus 235 to the active management device 300. The active management device 300 receives the DHCPDISCOVER message via its I/O bus interface 350 (FIG. 3) which forwards the message via I/O bus 345 to the processor 340. The processor 340 examines the DHCPDISCOVER message and determines that a DHCPDISCOVER message has been sent by the client node 200 (step 1110).

The processor 340 forwards the DHCPDISCOVER message via bus 345 to the network device interface 370. The network device interface forwards the message to the network device 280 for transfer onto the network 100. The DHCPDISCOVER message travels via the network 100 to the server node 400.

The server node's network interface 480 (FIG. 4) receives the DHCPDISCOVER message and transfers it to the processor 430 via bus 445. The processor 430 executing the DHCP services 424 recognizes that the message is a DHCPDISCOVER message and proceeds to process it accordingly. This processing illustratively includes querying DHCP DB 452 to locate configuration information for client node 200. The processor 430 then generates a DHCPOFFER message containing the configuration information and the address of the server, and forwards the DHCPOFFER message to the client 200 via network interface 480.

The message travels to the client 200 via network 100 and is forwarded to the active management device 300. The active management device 300 receives the DHCPOFFER message at network interface 370 and forwards it to the processor 340. The processor 340 executing the management process 334 recognizes the message as a DHCPOFFER message and concludes that a DHCPOFFER message has been received (step 1115). The DHCPOFFER message is then forwarded to the processor 230 for further processing.

The processor 230 processes the DHCPOFFER message, generates a DHCPREQUEST message containing the address of the server and forwards the DHCPREQUEST message via bus 235 to the active management device 300. The active management device 300 receives the DHCPREQUEST message and processes it including determining that a DHCPREQUEST message has been sent by the client (step 1120). The active management device 300 forwards the message to the network interface 280 which places the message onto the network 100.

The message is forwarded via the network 100 to the server 400. The server 400 receives the DHCPREQUEST message, processes it, generates a DHCPACK message and forwards the DHCPACK message to the client node 200. The client node 200 receives the DHCPACK message and forwards the message to the active management device 300. The active management device 300 determines that a DHCPACK has been received and concludes that a DHCP session has been established between the client node 200 and the server 400 (step 1125). It should be noted that in the course of processing the various messages involved in establishing the session, the active management device 300 may store various information associated with the session, such as the address of the server as well as the address assigned to the client by the server.

The active management device 300 proceeds to monitor the state of the client node 200 (steps 1020, 1135). This monitoring may include monitoring DHCP messages 500 associated with the session between the client 200 and the server 400 to determine if the client 200 has terminated the session by issuing, e.g., a DHCPRELEASE message to the server 400. Further, the active management device 300 determines if a condition exists on the client 200 that warrants terminating the DHCP session between the client 200 and the server 400 (steps 1030, 1140). Assuming a condition exists that warrants terminating the session, the active management device 300 determines if a DHCPRELEASE message has been sent by the client 200 to the server 400 (steps 1040, 1145). Assuming that the client 200 has not sent a DHCPRELEASE message, the active management device 300 then notifies the server 400 that the session is to be terminated (step 1050). Specifically, the active management device 300 generates a DHCPRELEASE message (step 1150) and forwards the DHCPRELEASE message to the server (step 1155). The message travels via network 100 to the server 400 where it is processed and the session is terminated.

Figure 12A:
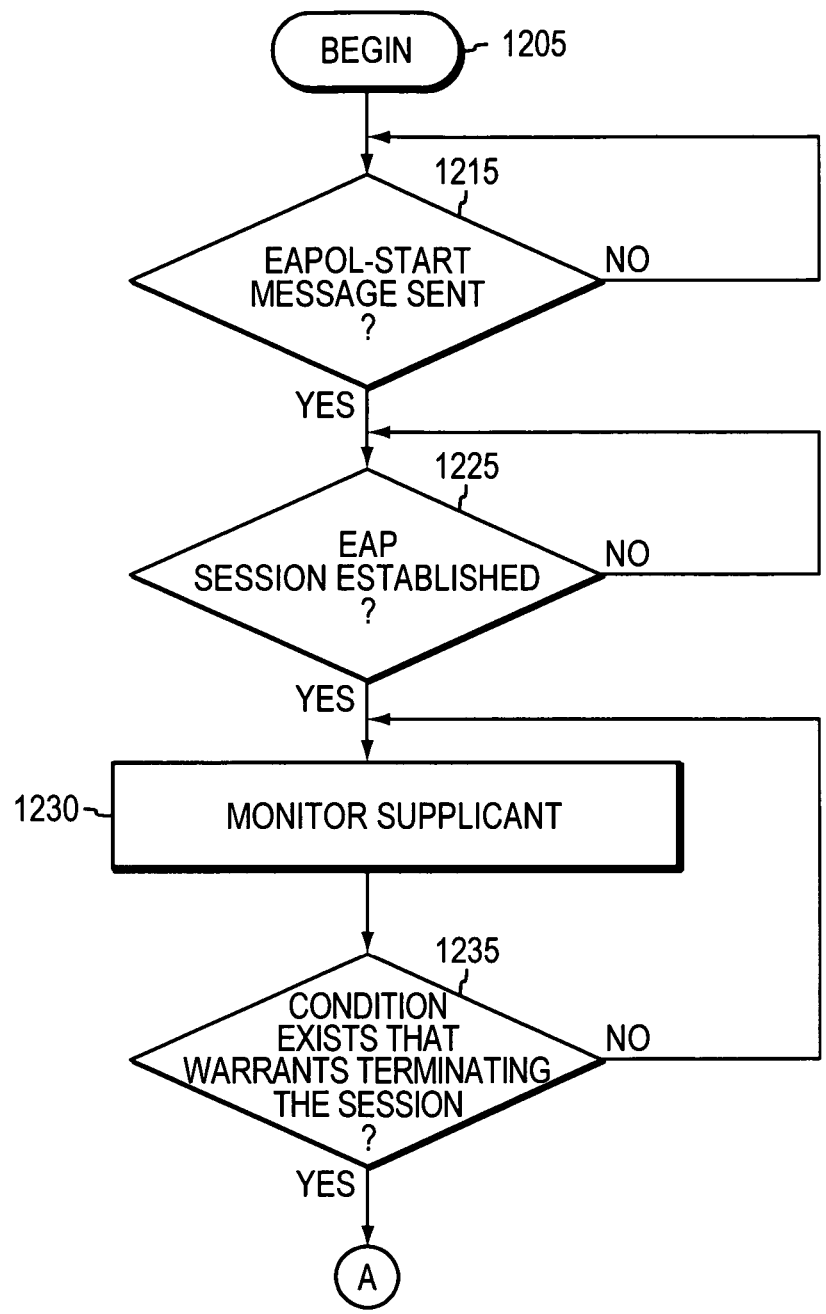
FIGS. 12A-B are a flow chart of a sequence of steps that may be used to configure a client to terminate an EAP authorization session between the client and a server in accordance with an aspect of the present invention.
Figure 12B:
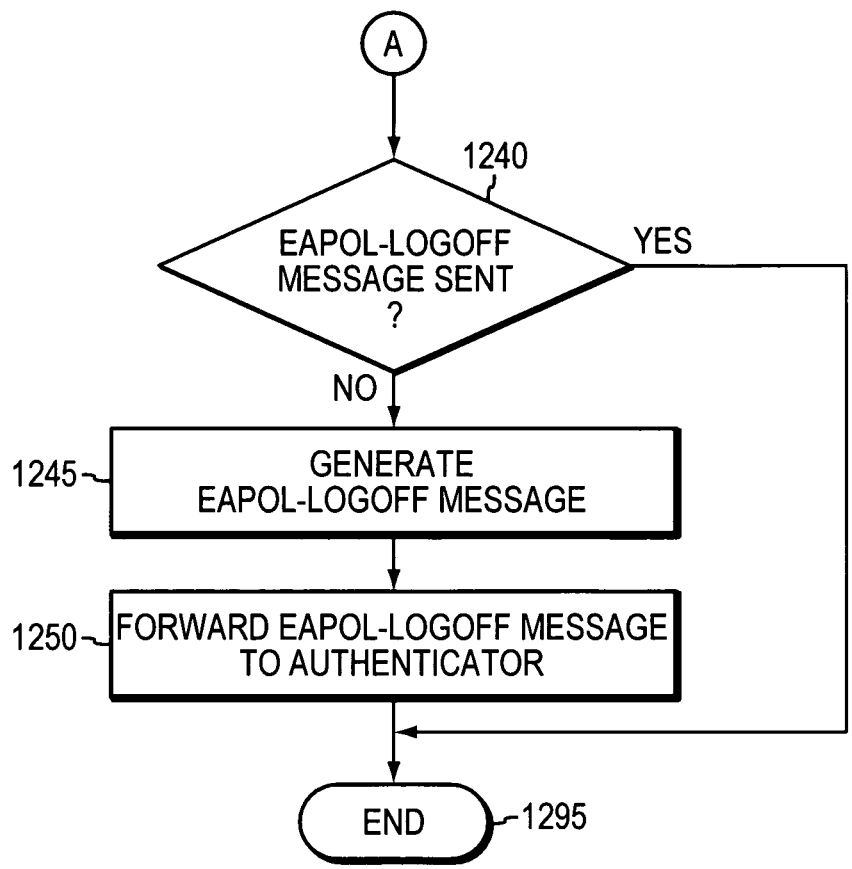

As noted above, the present invention may be used to terminate an EAP authentication session between a supplicant (client) and an authenticator (server). FIGS. 12A-B are a flow chart of a sequence of steps that may be used to configure a node 200 to terminate an authentication session between a supplicant at node 200 and an authenticator (e.g., at an intermediate node 140) in accordance with an aspect of the present invention.

The sequence beings at step 1205 and proceeds to step 1215 where a check is performed to determine if an EAPOL-START message has been sent by the supplicant. If not, the sequence returns to step 1215. Otherwise, the sequence proceeds to step 1225 where a check is performed to determine if an EAP session has been established between the supplicant and the authenticator. Note that this determination is illustratively made by monitoring EAP message traffic at the supplicant to ensure a correct sequence of EAP messages 700 have been sent/received by the supplicant that indicates an EAP session has been established between the supplicant and the authenticator.

Assuming that an EAP session has been established, the sequence proceeds to step 1230 where the supplicant is monitored and step 1235 where a check is performed to determine if a condition exists that warrants terminating the EAP session, as described above. If a condition does not exist that warrants terminating the session, the sequence returns to step 1230. Otherwise, the sequence proceeds to step 1240 (FIG. 12B) where a check is performed to determine if an EAPOL-LOGOFF message had been sent by the supplicant to the authenticator. If so, the sequence proceeds to step 1295. Otherwise, the sequence proceeds to step 1245 where an EAPOL-LOGOFF message is generated and step 1250 where the generated EAPOL-LOGOFF message is forwarded to the authenticator. The sequence ends at step 1295.

For example, referring to FIGS. 1, 10, and 12A-B, assume that a supplicant at client node 200 is to establish an authentication session with an authenticator at intermediate node 140a. Further assume that node 200 is configured to terminate authentication sessions in accordance with aspects of the present invention described above. The supplicant initiates the authentication session by generating and forwarding an EAPOL-START message to the authenticator. Specifically, processor 230 (FIG. 2) generates a packet 600 wherein the packet type indicates the packet 600 is an EAPOL-START packet. Processor 230 then forwards the generated packet 600 via bus 235 to the active management device 300. The active management device 300 receives the EAPOL-START packet and forwards it to processor 340, as described above. The processor 340 processes the EAPOL-START message including determining that an EAPOL-START message has been sent by the supplicant (step 1215). The active management device 300 continues to monitor message traffic between the supplicant and the authenticator to determine if an EAP, session has been successfully established, as described above (steps 1010, 1225).

Assuming an EAP session has been successfully established, active management device 300 monitors the client node 200 (steps 1020, 1230) to determine if a condition exists that warrants terminating the session (steps 1030, 1235). Assuming a condition exists that warrants terminating the session, active management device 300 determines if the supplicant has already sent an EAPOL-LOGOFF message to the authenticator to terminate the session (steps 1040, 1240).

Assuming that the supplicant has not issued an EAPOL-LOGOFF message to the authenticator, active management device 300 proceeds to notify the authenticator that the session between it and the supplicant is to be terminated (step 1050). Specifically, the active management device's processor 340 generates a packet 600 wherein the packet type contained in the packet 600 indicates the packet is an EAPOL-LOGOFF message (step 1245). The processor 340 then forwards the generated EAPOL-LOGOFF message to the network device interface 370 which transfers the EAPOL-LOGOFF message to the network device interface 280. The network device interface 280 transfers the packet 600 onto the network 100 wherein it travels to intermediate node 140*a*. Intermediate node 140*a* receives the EAPOL-LOGOFF message 600 and the authentication services 426 concludes that the authentication session between the supplicant and the authenticator has been terminated.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method comprising:
    establishing a network communication session between a client and a server, wherein the server provides a lease, the lease providing exclusive use of configuration information for a predetermined period of time to the client;
    employing a management function on the client that internally monitors the client, the management function performing operations comprising:
        detecting that the network communication session exists between the client and the server;
        monitoring, in response to determining that the network communication session exists between the client and server, an operational status of the client;
        determining, while monitoring the operational status of the client, whether a condition exists with the client prior to the expiration of the lease such that the configuration information may be released for exclusive use by another client, wherein the condition is determined by performing a first test and a second test, wherein the first test comprises determining whether the client has issued a message indicating it is terminating the session, wherein the second test comprises determining whether the client is able to continue the session;
        monitoring, internally, messages issued by the client to the server for a message indicating that the configuration information may be released for exclusive use by the other client;
        determining whether the client has failed to issue the message indicating that the configuration information may be released for exclusive use by the other client; and
        issuing a second message, in response to determining that the client has failed to issue the message, to the server indicating that the session is to be terminated prior to the expiration of the lease and that the configuration information may be released for exclusive use by the other client.

2. A method as defined in claim 1 wherein the network communication session is a session associated with a host configuration protocol.

3. A method as defined in claim 2 wherein the host configuration protocol is the Dynamic Host Configuration Protocol (DHCP).

4. A method as defined in claim 1 wherein the network communication session is an authentication session.

5. A method as defined in claim 4 wherein the authentication session is established using the Extensible Authentication Protocol (EAP).

6. A method as defined in claim 3 wherein issuing the second message to the server indicating that the session is to be terminated prior to the expiration of the predetermined period of time comprises:
    issuing a DHCPRELEASE message.

7. A method as defined in claim 5 wherein issuing the second message to the server indicating that the session is to be terminated prior to the expiration of the predetermined period of time comprises:
    issuing an EAP Over LAN logoff (EAPOL-LOGOFF) message.

8. An apparatus comprising:
    a network device interface in a client configured to establish a network communication session between a client and a server, wherein the server provides a lease, the lease providing exclusive use of configuration information for a predetermined period of time to the client; and
    a processor configured to perform a management function on the client that internally monitors the client, wherein the management function performs operations comprising:
        (a) detecting that the network communication session exists between the client and the server,
        (b) determining, while monitoring the operational status of the client, whether a condition exists with the client prior to the expiration of the lease such that the configuration information may be released for exclusive use by another client, wherein the condition is determined by performing a first test and a second test, wherein the first test comprises determining whether the client has issued a message indicating it is terminating the session, wherein the second test comprises determining whether the client is able to continue the session,
        (c) monitoring, internally, messages transmitted by the client to the server for a message indicating that the configuration information may be released for exclusive use by the other client,
        (d) determining whether the client has failed to issue the message indicating that the configuration information may be released for exclusive use by the other client, and
        (e) transmitting a second message, in response to determining that the client has failed to issue the message, to the server indicating that the session is to be terminated prior to the expiration of the lease and that the configuration information may be released for exclusive use by the other client.

9. An apparatus as defined in claim 8 further comprising:
    an Input/Output (I/O) bus interface configured to report the status of the client to the processor.

10. An apparatus as defined in claim 8 further comprising:
    an I/O bus interface configured to provide messages transferred between the client and the server to the processor.

11. A device comprising:
means for establishing a network communication session between a client and a server, wherein the server provides a lease, the lease providing exclusive use of configuration information for a predetermined period of time to the client;
means for employing a management function on the client that internally monitors the client, the management function performing operations comprising:
   detecting that the network communication session exists between the client and the server;
   monitoring, in response to determining that the network communication session exists between the client and server, an operational status of the client;
   determining, while monitoring the operational status of the client, whether a condition exists with the client prior to the expiration of the lease such that the configuration information may be released for exclusive use by another client, wherein the condition is determined by performing a first test and a second test, wherein the first test comprises determining whether the client has issued a message indicating it is terminating the session, wherein the second test comprises determining whether the client is able to continue the session;
   monitoring, internally, messages issued by the client to the server for a message indicating that the configuration information may be released for exclusive use by the other client;
   determining whether the client has failed to issue the message indicating that the configuration information may be released for exclusive use by the other client; and
   issuing a second message, in response to determining that the client has failed to issue the message, to the server indicating that the session is to be terminated prior to the expiration of the lease and that the configuration information may be released for exclusive use by the other client.

12. A non-transitory computer readable medium comprising computer-executable instructions for:
   establishing a network communication session between a client and a server, wherein the server provides a lease, the lease providing exclusive use of configuration information for a predetermined period of time to the client;
   employing a management function on the client that internally monitors the client, the management function performing operations comprising:
      detecting that the network communication session exists between the client and the server;
      monitoring, in response to determining that the network communication session exists between the client and server, an operational status of the client;
      determining, while monitoring the operational status of the client, that whether a condition exists with the client prior to the expiration of the lease such that the configuration information may be released for exclusive use by another client, wherein the condition is determined by performing a first test and a second test, wherein the first test comprises determining whether the client has issued a message indicating it is terminating the session, wherein the second test comprises determining whether the client is able to continue the session;
      monitoring, internally, messages issued by the client to the server for a message indicating that the configuration information may be released for exclusive use by the other client;
      determining whether the client has failed to issue the message indicating that the configuration information may be released for exclusive use by the other client; and
      issuing a second message, in response to determining that the client has failed to issue the message, to the server indicating that the session is to be terminated prior to the expiration of the lease and that the configuration information may be released for exclusive use by the other client.

13. A method as defined in claim 1, wherein determining whether the client is able to continue the session comprises:
   determining that the client software using the information from the server has run to completion.

14. A method as defined in claim 1, wherein determining that a condition exists such that the configuration information may be released for use by another client comprises:
   determining that the client is powering down.

* * * * *